(12) United States Patent
Chowdhury et al.

(10) Patent No.: US 9,436,575 B2
(45) Date of Patent: Sep. 6, 2016

(54) SELECTIVE PROFILING OF APPLICATIONS

(71) Applicant: TATA CONSULTANCY SERVICES LIMITED, Mumbai, Maharashtra (IN)

(72) Inventors: Kallol Saha Chowdhury, Kolkata (IN); Swarup Chatterjee, Kolkata (IN)

(73) Assignee: TATA CONSULTANCY SERVICES LIMITED (IN)

(*) Notice: Subject to any disclaimer, the term of this patent is extended or adjusted under 35 U.S.C. 154(b) by 16 days.

(21) Appl. No.: 14/623,780

(22) Filed: Feb. 17, 2015

(65) Prior Publication Data
US 2015/0261646 A1 Sep. 17, 2015

(30) Foreign Application Priority Data
Mar. 11, 2014 (IN) .......................... 819/MUM/2014

(51) Int. Cl.
  G06F 9/44 (2006.01)
  G06F 11/34 (2006.01)
(52) U.S. Cl.
  CPC ....... *G06F 11/3409* (2013.01); *G06F 11/3466* (2013.01)
(58) Field of Classification Search
  None
  See application file for complete search history.

(56) References Cited

U.S. PATENT DOCUMENTS

| | | | |
|---|---|---|---|
| 6,792,460 B2 | 9/2004 | Oulu et al. | |
| 6,934,935 B1* | 8/2005 | Bennett | G06F 11/323 714/E11.181 |
| 7,870,244 B2 | 1/2011 | Chong et al. | |
| 9,129,056 B2* | 9/2015 | Schmelter | G06F 11/3466 |
| 2004/0039926 A1* | 2/2004 | Lambert | 713/189 |
| 2004/0064552 A1* | 4/2004 | Chong et al. | 709/224 |
| 2007/0122778 A1* | 5/2007 | Beitel | G09B 5/06 434/219 |
| 2008/0086540 A1* | 4/2008 | Scott et al. | 709/217 |
| 2008/0178147 A1* | 7/2008 | Meliksetian et al. | 717/107 |
| 2010/0138811 A1* | 6/2010 | Jayaraman et al. | 717/125 |
| 2012/0005674 A1* | 1/2012 | Larimore et al. | 718/1 |
| 2013/0030764 A1* | 1/2013 | Chatterjee et al. | 702/182 |
| 2014/0109082 A1* | 4/2014 | Kimmet et al. | 717/176 |
| 2014/0129793 A1* | 5/2014 | Crosby et al. | 711/170 |

* cited by examiner

*Primary Examiner* — Daxin Wu
(74) *Attorney, Agent, or Firm* — Barnes & Thornburg LLP

(57) ABSTRACT

A computer implemented method for selective profiling of an application is disclosed herein. The method includes selecting at least one filter type for selecting one or more categories of functional blocks in an application file to be profiled. Based on the selected filter type, a relational hierarchical structure of functional blocks of the application file in the selected category is determined. The determining can be further based on an archive file associated with the application file. Further, one or more functional blocks are selected from the relational hierarchical structure for profiling, the selected functional blocks being associated with a functionality of the application. The selected functional blocks are profiled to achieve selective profiling of the application file for the functionality.

13 Claims, 2 Drawing Sheets

SELECTIVE PROFILING OF APPLICATIONS

PRIORITY CLAIM

This application claims priority to Indian Patent Application No. 819/MUM/2014, filed 11 Mar. 2014, the disclosure of which is incorporated herein by reference in its entirety.

TECHNICAL FIELD

The present subject matter relates, in general, to profiling of applications and, particularly but not exclusively, to selective profiling of applications.

BACKGROUND

Typically, a large software application is highly complex and made up of a large number of interacting functional blocks, also referred to as modules or code blocks. Further, in such a large software application, the functional blocks have a relational hierarchical structure in which some functional blocks perform higher-level tasks whilst depending on lower-level functions for certain tasks.

The performance of such applications is usually monitored in the background and efforts are made towards optimization of the performance. In general, for optimization, the application is profiled and estimation of various performance parameters is often achieved. For example, during the profiling of the application, information regarding execution time, resource consumption, response time, and thread statistics for the application and the functional blocks can be achieved.

Usually, during profiling of applications, the profiling data collected for the application is in relatively large in size. Therefore, generally, while profiling, the profiling data collected is filtered based on the functional blocks for which the profiling is to be done. Conventionally, for filtering profiling data for a heavily nested functional block, a user carrying out the profiling provides an exact hierarchical location or address of the functional block in the application.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
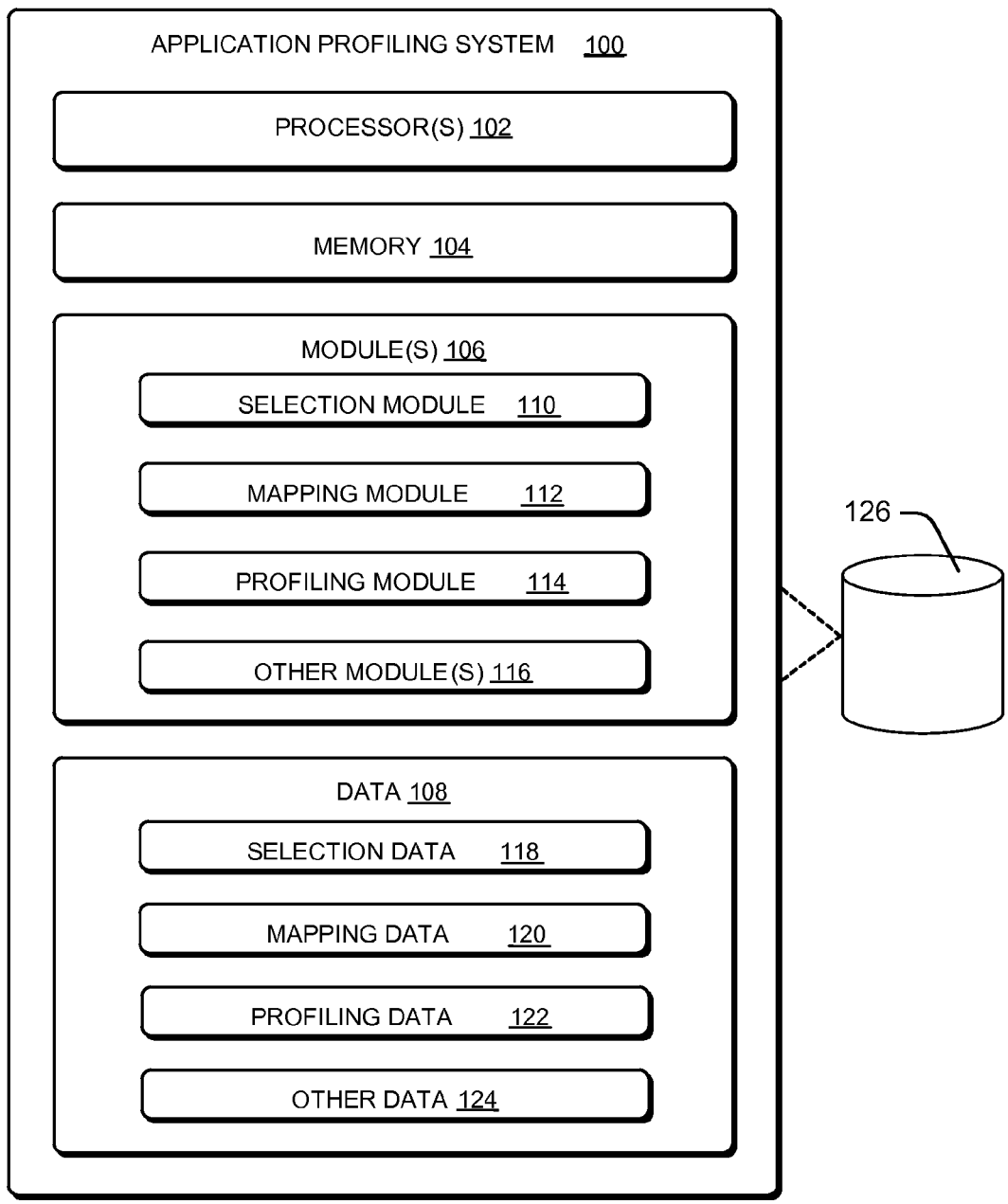
FIG. 1 illustrates an application profiling system for selective profiling of an application, in accordance with an implementation of the present subject matter.

The present subject matter relates to filtering data during profiling of an application.

Conventionally, profiling of complex software applications involves use of a profiling tool for profiling of various functional blocks of the application associated with a functionality executed by the application. For example, a web application can be profiled for the functionality associated with "login" operation of the web application when running on a client device. Generally, for profiling one or more such functionalities, the functional block of the application associated with the functionality is to be analyzed by the profiling tool. However, in case the data for the web application is not filtered based on the associated functional block, all the data associated with the web application, such as executable files and libraries, is profiled.

This can be understood with reference to the operation of JAVA-based applications. In a JAVA application, the functional blocks, referred to as packages, are formed by a hierarchy of various classes and methods. In one example, for execution of the JAVA application, a JAVA Virtual Machine (JVM), responsible for the execution of the JAVA application, can load various JAVA classes. Therefore, when a functionality associated with the JAVA application is being accessed, in fact, the JVM is being invoked for loading of the various classes associated with a functionality of the application being accessed. When the conventional profiling tools are used to profile the functionality without a filter, all the classes that are associated with that functionality are profiled. In certain cases, few classes associated with the functionality may reside on another device than the one on which the application resides, and the conventional profiling tools may profile such classes. Further, as part of the profiling operation, the profiling tool may modify the class file or a bytecode associated with the class file during run time and then execute the class file. In the above case, where all the classes of the application are to be profiled, the profiling tool will modify each class file and then execute the file, which may lead to a large computational overhead.

Other conventional tools can provide an option for the user to interact with the profiling tool. In such a case, the user can list down the class or method or package that the user would like to profile and analyze. In such a scenario, if a package is listed for profiling, the amount of data to be profiled is huge and will require lots of resources, since the package has a huge number of classes and methods associated therewith. On the other hand, the results of such profiling are difficult for the user to analyze and identify the problematic methods or classes which are affecting the operation of the application and require attention.

Considering another example in which the user may be able to provide the class name or the method name associated with the functionality to be profiled for the application. However, the functional blocks in the application are generally associated with each other, in a complex manner in certain cases. In such case, providing one class or method associated with that functionality may not suffice for profiling that functionality, and the user may have to provide the names of all such associated functional blocks. Accordingly, in an example, the names of classes and method have to be provided accurately and any error in providing the names of the class or the method may not provide the correct results of profiling. However, remembering and accurately providing such names and addresses of each functional block may be difficult and, in certain cases, infeasible for the user.

Further, certain conventional tools allow for filtering of profiling data. In such conventional tools, the user may select one or more high level functional blocks in the hierarchy for an application. Based on the selection of the high level parameters, the tool then determines the functional blocks at the lowest hierarchical level associated with the high level functional block. For example, in case of a JAVA application, the user may select two components of the application to be profiled and for which the profiling data is to be filtered. The tool can determine and provide to the user a list of all the methods associated with the selected component. However, the conventional tool does not provide a relational hierarchical structure of the application, and the user is unable to determine the packages and the classes associated with the component. Consider a case in which two method level blocks are determined by the tool, associated with the two components of the application. In such a case, the user is unable to identify which method belongs to which component, and accordingly, the overall exercise of profiling may turn out to be futile. Further, in certain cases, during development of the application, the developer can use certain unique names for the various functional blocks, say classes and methods of the application. However, while testing the tester may not be the same person as the developer and may be unable to remember or deduce the names that the developer has used for the functional blocks.

Further, even if the user is able to cope with the results of profiling of a substantially small application, the above problem proliferates to unmanageable proportions when profiling is achieved for large applications. For example, consider a case in which innumerable applications are deployed in a distributed environment having a number of servers and devices, and the profiling of one component of one application on one of the servers is to be done. In such a case, the profiling tool will provide to the user with the methods associated with the component on various devices or servers or both on which the application and the component are deployed. The amount of data, in such a case, is of such great proportions that it may not be possible for the user to analyze the data.

In addition, in case an application residing on a server is to be profiled, the conventional tools entirely profile such an application when the application is deployed and in an online mode, i.e., in the mode that the application is accessible on a web server. For example, the filtering of the data or classes to be profiled can be achieved in the online mode. This is because the convention tools utilize a configuration file associated with the application to determine the functional blocks at the lowest hierarchical level and provide to the user. The configuration file is stored on the web server on which instances of the deployed application are executed. For instance, if there are n web servers on which instances of the application are being executed, then the configuration files on each of the servers are accessed and the lowest level hierarchical level functional blocks determined. However, in the offline mode the n web servers are inaccessible and, therefore, the conventional tools fail to filter the data and, thereby, profile the application, in such a case where the application is offline.

The present subject matter relates to selective profiling of applications, in accordance with an embodiment. In an implementation, an application file to be profiled can be selected by a user for filtering purposes. In one example, the application file selected for filtering can be the entire application. In yet another example, the application file can include a subset of executable files, classes, or methods of the application to be profiled. For instance, such subsets may be stored in a simple folder structure and selected by the user. Based on the selection, a relational hierarchical structure of the application can be generated and provided to the user, prior to the profiling. From the relational hierarchical structure, the user can select one or more functional blocks on the basis of which the application is to be profiled. On the basis of the selected functional blocks, a profiling checklist including the selected functional blocks can be generated. Subsequently, when the application is profiled, each functional block loaded for profiling is verified against the profiling checklist and those functional blocks that are in the profiling checklist are profiled, thereby allowing for selective profiling of the application. In an example, in case of a JAVA application, the functional block can be a method, a class, or a package within the JAVA application. In another example, in addition to the application files, one or more libraries associated with the application can be selected, filtered, and profiled.

According to an aspect, an archive file associated with the selected application file is used for determining the relational hierarchical structure. An archive file can be understood as aggregate of various files indicative of a relational hierarchical structure of the functional blocks and associated metadata and resources for the application. For example, in case a JAVA application is to be profiled, the archive file can be one or more of the JAVA archive file (JAR), an enterprise archive (EAR) file, or a web application archive (WAR) file. In another example, an archive file folder structure can be created in which the files from the archive file to be profiled such as application class files can be moved, and the relational hierarchical structure can be generated based on the archive file folder structure. In said examples, the archive file can be a compressed file having the executables and libraries associated with the application file, and the information regarding the structural hierarchy of packages, classes, and methods in the application file can be extracted from the archive files. Since, the present subject matter uses the archive file instead of the configuration file for determining the relational hierarchical structure of the functional blocks associated with the application, the application file can be filtered in the offline mode, i.e., when the application is not deployed or when the application is not being accessed by different client devices. As a result, the present subject matter provides for a convenient profiling of the application file. In addition, since the application is in offline mode, the profiling tool does not have to connect to different servers nor extract data from such servers which prevents filtering and profiling of large amounts of data.

In an implementation, for the generation of the relational hierarchical structure, the user can first select a filter type to be used for obtaining a few functional blocks of the application from among which the selection is to be made. As a result, the user can conveniently select the functional blocks to be included in the profiling checklist and does not have to analyze the entire elaborate relational hierarchical structure of the application. Subsequent to the selected filter type, the archive file can be parsed and the relational hierarchical structure can be generated for the application, based on the selected filter type. In an example, the application file can be decrypted based on the selected filter types for generating the hierarchical model of the archive file.

In an example, in case of profiling of a JAVA application, the filter type can include package level filter, class level filter, and method level filter. The filter type can be indicative of the selection of a category of the functional block of the application which is to be profiled. Accordingly, by selecting the filter type, the user can select whether the category of packages, classes, the methods, or a combination thereof, is to be profiled.

Further, the relational hierarchical model can depict internal relationships between the functional blocks of the application file in order of hierarchy. For instance, for the JAVA application, the hierarchical model can show packages, classes, and methods, and the correlations among the packages, classes, and methods. Accordingly, the user may obtain a comprehensive perspective on the relational hierarchical structure of the various functional blocks and the relationship among the functional blocks in the application. In one case the class level filter is selected, the profiling tool can provide a relational hierarchical structure of the classes associated with the JAVA archive file is generated and may not illustrate the methods included in the class. From the relational hierarchical structure, the user can select one or more functional blocks or libraries, for example, packages, classes, methods, or combinations thereof, relevant for testing the functionality of the application. In one implementation, the entire address or name of the selected functional blocks can be determined and saved on the profiling checklist.

In said implementation, in case the user does not select the filter type, the entire archive file can be parsed and the relational hierarchical structure of the entire application can be provided to the user. In such a case, the user can select the functional blocks or libraries from the entire hierarchical model of the archive file for the application for further carrying out selective profiling of the application, in the manner explained above.

Subsequent to the generation of the profiling checklist, the profiling of the application can be commenced. As part of profiling, each functional block or library as the case may be can be loaded from the archive file. In an example, in case of the JAVA application being profiled, each class can be loaded from the archive file, say the WAR, the EAR, or the JAR. As described previously, as each functional block is loaded, the functional block is checked against the functional blocks in the profiling checklist to determine whether that functional block is to be profiled or not. Accordingly, the selected functional blocks are profiled and the ones not selected are disregarded.

As a result of such selective profiling of the functional blocks, a considerable amount of computational resources are saved since the selected functional blocks are profiled. As explained above, during run time the bytecode associated with each functional block is modified and then the functional block executed. In the present subject matter, the user may select 2 out of 50 functional blocks to be profiled. In such a case, since the selected functional blocks or files are modified, the overhead associated with the profiling process is considerably less. Therefore, when the application is being tested in accordance with the present subject matter, the profiling of the application may take about 2 seconds, as compared to 7-9 seconds taken by the conventional tools for profiling the application.

Further, since the amount of data generated from profiling is low, the computational resources for further processing such data are also considerably less. In an example, the data that is generated as a result of the profiling can be processed and analyzed to render the data into human readable or presentable. Consequently, the user can conveniently analyze the resultant information from the profiling exercise, say to identify the functional blocks which are affecting the performance of the application.

These and other advantages of the present subject matter would be described in greater detail in conjunction with the following figures. While aspects of described systems and methods for selective profiling of applications can be implemented in any number of different computing systems, environments, and/or configurations, the embodiments are described in the context of the following device(s).

FIG. 1 illustrates an application profiling system 100 for selective profiling of an application, in accordance with an implementation of the present subject matter. In said implementation, the application profiling system 100, hereinafter referred to as system 100, can be implemented as a computing device, such as a laptop computer, a desktop computer, a notebook, a workstation, a mainframe computer, a server, and the like.

Further, in said implementation, the system 100 includes processor(s) 102 and memory 104. The processor 102 may be implemented as one or more microprocessors, microcomputers, microcontrollers, digital signal processors, central processing units, state machines, logic circuitries, and/or any devices that manipulate signals, based on operational instructions. Among other capabilities, the processor(s) 102 is provided to fetch and execute computer-readable instructions stored in the memory 104. The memory 104 may be coupled to the processor 102 and can include any computer-readable medium known in the art including, for example, volatile memory, such as Static Random Access Memory (SRAM) and Dynamic Random Access Memory (DRAM), and/or non-volatile memory, such as Read Only Memory (ROM), erasable programmable ROM, flash memories, hard disks, optical disks, and magnetic tapes.

Further, the system 100 may include module(s) 106 and data 108. The modules 106 and the data 108 may be coupled to the processors 102. The modules 106, amongst other things, include routines, programs, objects, components, data structures, etc., which perform particular tasks or implement particular abstract data types. The modules 106 may also, be implemented as, signal processor(s), state machine(s), logic circuitries, and/or any other device or component that manipulate signals based on operational instructions.

In an implementation, the module(s) 106 include a selection module 110, a mapping module 112, a profiling module 114, and other module(s) 116. The other module(s) 116 may include programs or coded instructions that supplement applications or functions performed by the system 100. Additionally, in said implementation, the data 108 includes a selection data 118, a mapping data 120, a profiling data 122, and other data 124. The other data 124 amongst other things, may serve as a repository for storing data that is processed, received, or generated, as a result of the execution of one or more modules in the module(s). Although the data 108 is shown internal to the system 100, it may be understood that the data 108 can reside in an external repository (not shown in the figure), which may be operably coupled to the system 100. Accordingly, the system 100 may be provided with interface(s) (not shown) to communicate with the external repository to obtain information from the data 108.

In addition, in an implementation, the application profiling system 100 can include a display unit 126 which can provide a graphical user interface (GUI) for a user of the system 100 to directly interact with the system 100. As will be understood that although the display unit 126 is shown external and separate from the system 100, the display unit 126 can be internal and integral to the system 100.

In operation, the system 100 provides for selective profiling of applications, in accordance with an implementation. In said implementation, the selection module 110 can prompt a user to select an application file associated with the application, for filtering and for further profiling. In another implementation, the selection module 110 prompts a user to provide an application for profiling. In the latter case, the user can provide an address or location of an application for the system 100 to profile. In both the above cases, the selection module 110 can provide the prompt on the display unit 126 for the user. In another case, the selection module 110 can select the application for profiling based on predefined rules, say stored in the selection data 118. For example, the predefined rules can recite a predetermined location from which the selection module 110 can automatically select the application or an application file for filtering.

In one example, the application file selected for filtering can be the entire application. In yet another example, the application file can include a subset of classes or methods of the application to be profiled. Such subsets may be stored in a simple folder structure and selected by the user. Based on the selection, a relational hierarchical structure of the application can be generated and provided to the user, prior to the profiling. In another implementation, the selection module 110 can select the functional blocks for filtering based on predetermined rules stored in the selection data 118. For example, the predetermined rules can include a rule that a certain type of functional blocks, say method level blocks, in the application are to be selected for filtering and based on that the hierarchical structure will be generated. From the relational hierarchical structure, the user can select one or more functional blocks on the basis of which the application is to be profiled.

On the basis of the selected functional blocks, a profiling checklist including the selected functional blocks can be generated. Subsequently, when the application is profiled, each functional block loaded for profiling is verified against the profiling checklist and those functional blocks that are in the profiling checklist are profiled, thereby allowing for selective profiling of the application. In an example, in case of a JAVA application, the functional block can be a method, a class, or a package within the JAVA application. In another example, in addition to the application files, one or more libraries associated with the application can be selected, filtered, and profiled.

Further, as part of profiling of the application, the mapping module 112 can generate a mapping of various functional blocks of the application file in the form of a relational hierarchical structure. The selection module 110 can, then, prompt the user to select one or more functional blocks. Subsequently, the profiling module 114 can profile the application file, based on the selected functional block. In another implementation, as mentioned above, the libraries associated with the application can be included in the relational hierarchical structure and provided for selection to the user, for profiling.

According to an aspect, the mapping module 112 can employ an archive file associated with the selected application file for determining the relational hierarchical structure. An archive file can be understood as aggregate of various files indicative of a relational hierarchical structure of the functional blocks and associated metadata and resources for the application. For example, in case a JAVA application is to be profiled, the archive file can be one or more of the JAVA archive file (JAR), an enterprise archive (EAR) file, or a web application archive (WAR) file. In said example, the information regarding the structural hierarchy of packages, classes, and methods, in the application from such files can be extracted from the archive files.

In the above example, as would be understood, the mapping module 112 can access each folder in the archive file to identify the application class files associated with the selected application file. The application class files can be understood as the terminal nodes or leaves in a tree-structure of the JAVA application and can be considered as the basic functional folder of the JAVA application. For instance, if the archive file contains various archive folders, such as smaller JAR folders, then the mapping module 112 extracts folder structure from each such archive folder and each folder in the folder structure is further accessed. This process continues until all the application class files in the archive file have been identified and analyzed. Based on the analysis of each application class file, the mapping module 112 determines the functional relationship between each functional block, say the method in the application class file, for generating the relational hierarchical structure for the application file. For instance, the mapping module 112 can be capable of segregating and analyzing the bytecodes of each of the application class files, to determine the inter-relationships of the application class file. For instance, the application class file can include the method and, in such a case, the mapping module 112 determines for each method the inter-relationship of the method with the package and the class and with other methods in the application file, and accordingly generates the relational hierarchical structure.

In an example, the mapping module 112 can obtain the archive file associated with the application from the location of the application, as obtained earlier by the selection module 110. In another example, the mapping module 112 can request the user to separately provide the location of the archive file associated with the application on the display unit 126 and obtain the location through the GUI on the display unit 126. The archive file can be temporarily stored in the mapping data 120.

In an implementation, for the generation of the relational hierarchical structure, the selection module 110 can prompt the user to first select a filter type for segregating a few functional blocks of the application. In said implementation, the selection module 110 can prompt the user through the display unit 126. Further, in an example, an input window can be provided in the GUI on the display unit 126 for the user to provide the selection of the filter type to the system 100.

In one case, the filter type can be indicative of the selection of a category of functional blocks for which the application is to be profiled. For example, in case of profiling of a JAVA application, the filter type can include package level filter, class level filter, and method level filter. Accordingly, by selecting the filter type, the user can select the category, i.e., packages, classes, or the methods of the application to be profiled. As will be explained later, from among the segregated functional blocks, the user may select relevant functional blocks for profiling. The selection of the filter type by the user can be provided to the mapping module 112 and stored in the mapping data 120.

Subsequent to the selection of the filter type, the mapping module 112 can parse the archive file associated with the application and, based on the selected filter type, generate the relational hierarchical structure. In an implementation, the mapping module 112 can render the hierarchical model on the GUI of the display unit 126 to depict a tree structure in which the functional blocks are hierarchically organized as per the internal structure of the application or the application file, as the case may be. For instance, where the application is a JAVA application and the class level filter is selected, the profiling tool can provide a relational hierarchical structure of the classes associated with the JAVA application and may not illustrate the methods included in the class. Such a relational hierarchical structure may show the relationships among the various functional blocks of the application. Further, in such a case, the system 100 can allow the user to select one or more of the classes, and subsequently, the mapping module 112 can generate the relational hierarchical structure for the selected method and provide the same to the user. In an example, the mapping module 112 can decrypt the application file based on the selected filter types for generating the hierarchical model of the archive file.

In another example, in case the user does not select the filter type, the mapping module 112 can parse the entire archive file and can generate an elaborate relational hierarchical structure of the entire application to provide to the user. In such a case, for the JAVA application, the hierarchical model can show all the packages, classes, and methods, and the correlations among the packages, classes, and methods. Accordingly, the user may obtain a comprehensive perspective on the relational hierarchical structure of the various functional blocks and the relationship among the functional blocks in the application.

According to an aspect, from the relational hierarchical structure, say provided to the user on the display unit 126, the selection module 110 can prompt the user to select one or more functional blocks or libraries, for example, packages, classes, methods, or combinations thereof, relevant for testing the functionality of the application file. In an implementation, the selection module 110 can provide the relational hierarchical structure rendered by the mapping module 112 on the display unit 126 for selecting the functional blocks through the GUI on the display unit 126. As a result, the user can conveniently select the functional blocks to be included in the profiling checklist and does not have to analyze the entire elaborate relational hierarchical structure of the application and simply the selected portions of the application, i.e., the relational hierarchical structure of the application file is analyzed.

The rendering of the relational hierarchical structure and the selection of the functional blocks is explained with reference to the following example. Consider a case of profiling of a JAVA application in which the functional blocks include methods, classes, and packages in ascending hierarchical order. In an example, the selection module 110 can obtain the location of the archive file from the user and also obtain the selection of the filter type from the user. If the user selects package filtering, then the GUI on the display unit 126 is populated with a tree structure or a relational hierarchical structure showing all the packages in the application in a hierarchical order. The GUI can include a check box attached with every node of the tree structure and the user can select one or more packages by selecting the check box. If the user selects class filtering, then the GUI is populated with the tree structure depicting all the packages in the application in a hierarchical order without any check box. When a node or package from the tree structure is selected, a class table can appear on the GUI. The table can include all the class associated with that selected package, each class having a checkbox associated therewith. The user can select any number of classes from the class table by selecting the checkboxes available with every class name in the table. If user selects method filtering then the GUI depicts the tree structure of the all the packages in the application without any check box, as explained above. The user can select any package and all the classes associated with that package appear in a list. Further, the user can select any class from that list, and a method table appears. The method table includes all the methods associated with that selected class. Subsequently, the user can select one or more methods from the table for profiling.

Further, on the basis of the selected functional blocks received from the user, as mentioned previously, the profiling module 114 can achieve the profiling of the selected functional blocks. In an implementation, the profiling module 114 can generate a profiling checklist to include the selected functional blocks. The profiling module 114 can use the profiling checklist while profiling the application, in accordance with the present subject matter. In an example, the profiling module 114 can determine and save the entire address or name of the selected functional blocks in the profiling checklist. The profiling checklist can be stored in the profiling data 122.

Subsequent to the generation of the profiling checklist, the profiling module 114 can begin profiling the application. As part of profiling, the profiling module 114 can load each functional block or library, as the case may be, from the archive file. According to an aspect, the profiling module 114 can verify each loaded functional block against the functional blocks in the profiling checklist, and profiles those functional blocks that are in the profiling checklist. As a result, the profiling module 114 profiles the selected functional blocks and disregards the ones not selected. Therefore, the profiling module 114 achieves selective profiling of the application. In an example, in case the profiling module 114 is profiling the JAVA application for which the class level filter was earlier selected, each class can be loaded from the archive file, say the WAR, the EAR, or the JAR, and checked in the profiling checklist to determine whether that class is to be profiled or not. In another example, the profiling module 114 can create a folder structure from the archive file to include various classes, and then the profiling module 114 can load the folder structure for profiling. As will be understood, the loading of the functional blocks by the profiling module 114 can be based on the type of server on which the application is deployed.

In an implementation, during profiling, the profiling module 114 can load each functional block determined to be in the profiling checklist and modify the bytecode associated with each such functional block before executing the functional block for profiling.

As a result of such selective profiling of the functional blocks, the system 100 saves a considerable amount of computational resources. In the present subject matter, the user may select 2 out of 50 functional blocks to be profiled. In such a case, since the selected functional blocks or files are modified, the overhead associated with the profiling process is considerably less. Therefore, when the application is being tested in accordance with the present subject matter, the profiling of the application may take about 2 seconds, as compared to 7-9 seconds taken by the conventional tools for profiling the application.

Further, the system 100 can further process and analyze the data that is generated as a result of the profiling to render the data into human readable or presentable. In one case, the system 100 can render the results of profiling on the display unit 126 for the user to conveniently view the results. Consequently, the user can analyze the resultant information from the profiling exercise, say to identify the functional blocks which are affecting the performance of the application.

Figure 2:
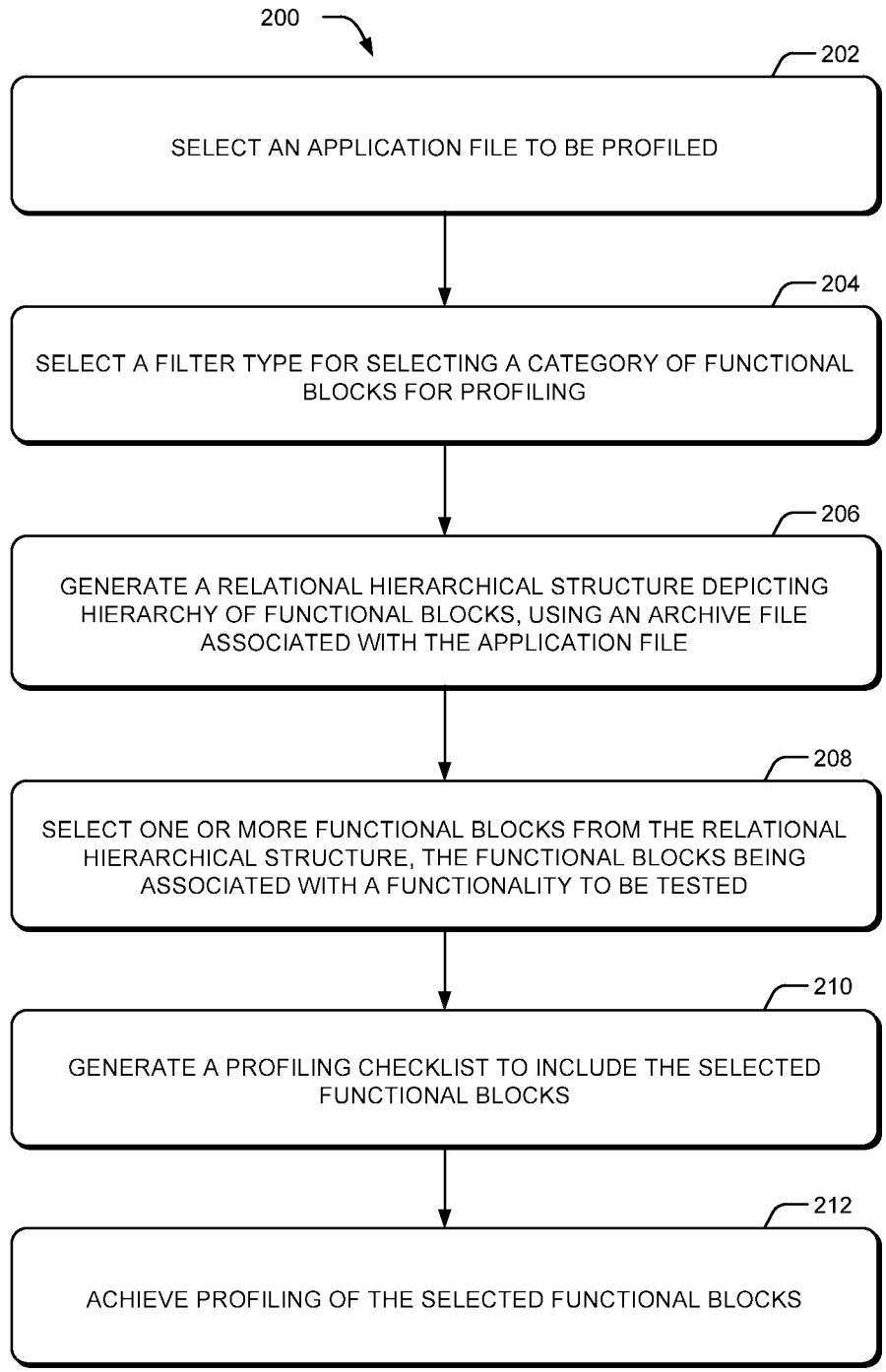
FIG. 2 illustrates a method for selective profiling of an application, in accordance with an implementation of the present subject matter.

FIG. 2 illustrates a method 200 for selective profiling of an application, according to an embodiment of the present subject matter. The order in which the method is described is not intended to be construed as a limitation, and any number of the described method blocks can be combined in any order to implement the method or any alternative method. Additionally, individual blocks may be deleted from the method without departing from the spirit and scope of the subject matter described herein. Furthermore, the method can be implemented in any suitable hardware, software, firmware, or combination thereof.

The method 200 may be described in the general context of computer executable instructions. Generally, the computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, the computer executable instructions may be located in both local and remote computer storage media, including memory storage devices.

In an implementation, one or more of the methods described herein may be implemented at least in part as instructions embodied in a non-transitory computer-readable medium and executable by one or more computing devices. In general, a processor, for example, a microprocessor, receives instructions, from a non-transitory computer-readable medium, for example, a memory, and executes those instructions, thereby performing one or more methods, including one or more of the methods described herein. Such instructions may be stored and/or transmitted using any of a variety of known computer-readable media.

With reference to the description of FIG. 2, for the sake of brevity, the details of the components of the application profiling system 100 are not discussed here. Such details can be understood as provided in the description provided with reference to FIG. 1.

Referring to FIG. 2, at block 202, an application file to be profiled is selected by a user. In one example, the application file selected for filtering can be the entire application. In yet another example, the application file can include a subset of classes or methods of the application to be profiled. Such subsets may be stored in a simple folder structure and selected by the user.

At block 204, a filter type is selected for selecting a category of functional blocks in the application file, for profiling. In such a case, the filter type can be indicative of the selection of a category of functional blocks for which the application file is to be profiled. For example, in case of profiling of a JAVA application, the filter type can include package level filter, class level filter, and method level filter. Accordingly, by selecting the filter type, the user can select the category, i.e., packages, classes, or the methods of the application to be profiled. In an example, the filter type can be selected for segregating few functional blocks of the application from among all the functional blocks of the application.

At block 206, a relational hierarchical structure depicting hierarchy of functional blocks is generated using an archive file associated with the application, based on the selected filter type. The relational hierarchical structure can depict a library structure or a structure in which the functional blocks are hierarchically organized in the application. For instance, where the application is a JAVA application and the class level filter is selected, the profiling tool can provide a relational hierarchical structure of the classes associated with the JAVA application and may not illustrate the methods included in the class. Such a relational hierarchical structure may show the relationships among the various classes of the application. Further, in such a case, the user can select one or more of the class filter type, and subsequently, the relational hierarchical structure can be generated for the selected method and provided to the user.

At block 208, one or more functional blocks, say relevant for testing the functionality of the application, are selected from the relational hierarchical structure. In an implementation, the relational hierarchical structure can be rendered on the display unit 126 for selecting the functional blocks through the GUI. As a result, the user can conveniently select the functional blocks to be included in the profiling checklist and does not have to analyze the entire elaborate relational hierarchical structure of the application.

Subsequently, the selective profiling of the application can be achieved. At block 210, on the basis of the selected functional blocks, a profiling checklist is generated to include the selected functional blocks. In an example, the entire address or name of the selection function blocks can be determined and saved in the profiling checklist.

At block 212, the profiling of the selected functional blocks is carried out. As part of profiling, each functional block or library, as the case may be, can be loaded from the archive file for profiling the application. According to an aspect, each loaded functional block can be checked against the functional blocks in the profiling checklist, and those functional blocks can be profiled that are in the profiling checklist. As a result, the profiling of selected functional blocks is achieved and the ones not selected are disregarded, thereby achieving selective profiling of the application.

Although implementations for methods and systems for selective profiling of an application are described, it is to be understood that the present subject matter is not necessarily limited to the specific features or methods described. Rather, the specific features and methods are disclosed as implementations for selective profiling of an application.

We claim:

1. A computer implemented method for selective profiling of an application, the computer implemented method comprising:
   selecting one or more categories of functional blocks for a corresponding filter type, in an application file;
   determining, by a processor, a relational hierarchical structure of the selected one or more categories of functional blocks for the corresponding filter type, wherein the determining is further based on an archive file associated with the application file, and wherein the archive file being indicative of a structural hierarchy of functional blocks and associated metadata of the application file;
   selecting at least one functional block from among the functional blocks based on the determined relational hierarchical structure, the at least one functional block being associated with a functionality of the application; and
   profiling, by the processor, the at least one functional block to achieve selective profiling of the application file for the functionality.

2. The computer implemented method as claimed in claim 1, wherein the filter type comprises a package level filter, a class level filter, and a method level filter.

3. The computer implemented method as claimed in claim 1, wherein the profiling the selected functional block comprises:
   generating a profiling checklist, based on the at least one functional block selected from the relational hierarchical structure; and
   profiling the at least one function block in the application file, based on the profiling checklist.

4. The computer implemented method as claimed in claim 1, wherein the archive file is at least one of a JAVA archive (JAR) file, an enterprise archive (EAR) file, a web application archive (WAR) file, and an archive file folder structure.

5. The computer implemented method as claimed in claim 1, wherein the determining the relational hierarchical structure comprises:
   parsing the archive file associated with the application; and decrypting the application file, based on the selected filter type.

6. The computer implemented method as claimed in claim 1, wherein the relational hierarchical structure is indicative of a relationship between the functional blocks of the application file in order of hierarchy.

7. The computer implemented method as claimed in claim 1, wherein the determining the relational hierarchical structure comprises generating the relational hierarchical structure based on parsing of the archive file when the application is in an offline mode.

8. An application profiling system for selective profiling of an application, the application profiling system comprising:
  a memory; and
  a processor; the memory coupled to the processor, wherein the processor is capable of executing programmed instructions stored in the memory to:
  select one or more categories of functional blocks for a corresponding filter type in an application file;
  determine a relational hierarchical structure of the selected one or more categories functional blocks for the corresponding filter type, wherein the determination of the relational hierarchical structure is further based on parsing of an archive file associated with the application file, wherein and wherein the archive file being indicative of a structural hierarchy of functional blocks and associated metadata of the application file;
  obtain a selection of at least one functional block from among the functional blocks based on the relational hierarchical structure, the at least one functional block being associated with a functionality of the application; and
  profile the at least one functional block for achieving selective profiling of the application file for the functionality.

9. The application profiling system as claimed in claim 8, wherein the processor is further configured by the instructions to;
  generate a profiling checklist, based on the at least one functional block selected from the relational hierarchical structure; and
  profile the at least one function block in the application file, based on the profiling checklist.

10. The application profiling system as claimed in claim 8, wherein the processor is further configured by the instructions to:
  parse the archive file associated with the application; and
  decrypt the application file, based on the selected filter type.

11. The application profiling system as claimed in claim 8, wherein the processor is further configured by the instructions to render the relational hierarchical structure of the application file on a display unit to obtain the selection of the functional blocks for profiling.

12. The application profiling system as claimed in claim 8, wherein the processor is further configured by the instructions to generate relational hierarchical structure based on parsing of the archive file when the application is in an offline mode.

13. A non-transitory computer-readable medium having embodied thereon a computer program for executing a method for selective profiling of an application, the method comprising:
  selecting one or more categories of functional blocks, for a corresponding filter type, in an application file;
  determining a relational hierarchical structure of the selected one or more categories of functional blocks for the corresponding filter type, wherein the determining is further based on an archive file of the application file, and wherein the determining comprises generating the relational hierarchical structure when the application is in an offline mode; and wherein the archive file being indicative of a structural hierarchy of functional blocks and associated metadata of the application file;
  selecting at least one functional block from the relational hierarchical structure for profiling, the at least one functional block being associated with a functionality of the application; and
  profiling the at least one functional block to achieve selective profiling of the application for the functionality.

* * * * *